United States Patent [19]

Haas, Sr. et al.

[11] Patent Number: 4,625,856
[45] Date of Patent: Dec. 2, 1986

[54] DEVICE FOR DEFLECTING FILLED WAFER SLICES ARRANGED IN JUXTAPOSED ROWS AND ADVANCED IN THE DIRECTION OF SAID ROWS

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 700,535

[22] Filed: Feb. 11, 1985

[30] Foreign Application Priority Data

Feb. 20, 1984 [AT] Austria ............................ 557/84

[51] Int. Cl.⁴ ............................................ B65G 47/26
[52] U.S. Cl. ................................ 198/457; 198/458; 198/497; 198/500
[58] Field of Search ............... 198/457, 458, 445, 446, 198/836, 626, 598, 497, 500

[56] References Cited

U.S. PATENT DOCUMENTS

| | | | |
|---|---|---|---|
| 1,791,728 | 2/1931 | Linfesty | 198/500 X |
| 2,439,657 | 4/1948 | Hexter et al. | 198/458 |
| 2,662,631 | 12/1953 | Kraus et al. | 198/454 X |
| 2,877,883 | 3/1959 | Lanham | 198/454 X |
| 4,353,455 | 10/1982 | Mumma et al. | 198/598 X |
| 4,445,878 | 5/1984 | Lanke et al. | 198/497 X |

Primary Examiner—Joseph E. Valenza
Assistant Examiner—D. Glenn Dayoan
Attorney, Agent, or Firm—Kurt Kelman

[57] ABSTRACT

The spacing between laterally closely juxtaposed, parallel, rectilinear rows of wafers filled with a sticky composition is increased by advancing the rows of wafers on a supporting surface in a first direction to entrance portions of guiding passages extending at a second direction angularly diverging from the first direction at a bend. The entrance portions are staggered in the direction of advancement. A rotary disc is associated with the entrance portion of each guiding passage and has an upper portion protruding through a slot in the supporting surface and constituting a guiding face facing the guiding passage, and a shaft is arranged below the supporting surface and rotatably supports the rotary disc. An oiling and/or cleaning device is associated with each rotary disc below the supporting surface for oiling and/or cleaning the guiding face of the rotary disc.

10 Claims, 3 Drawing Figures

DEVICE FOR DEFLECTING FILLED WAFER SLICES ARRANGED IN JUXTAPOSED ROWS AND ADVANCED IN THE DIRECTION OF SAID ROWS

BACKGROUND OF THE INVENTION

Field of the Invention

This invention relates to a device for deflecting and increasing the lateral spacing between juxtaposed rows and advanced of cream-filled wafers a supporting surface in the direction of the rows in a plurality of lanes associated with respective rows.

Filled wafers are formed by cutting apart wafer blocks in slicers provided with cutting wires. The filled wafers are arranged in juxtaposed, closely spaced apart longitudinal rows as they are pushed through the wafer block slicer and it is desired so to guide the wafers that they are laterally spaced apart. For this purpose the rows of wafers are pushed into a diverging device provided with thin guiding plates extending into respective gaps defined between juxtaposed wafers and having only a width equal to the thickness of a knife of the wafer block slicer. These guiding plates define divering passages, which have the configuration of a gently curved arc. Wafer slices filled with a sticky composition, such as caramel, are liable to soil the guiding plates very quickly, particularly in those areas in which the rows of wafers are being laterally deflected. In order to prevent the wafers from getting stuck, such a diverging device must often be cleaned so that the entire wafer production line must be shut down for correspondingly long times.

SUMMARY OF THE INVENTION

It is an object of the invention to eliminate these disadvantages.

This object is accomplished in accordance with the invention by providing a separate guiding passage defined by opposite side walls for guiding each row of the wafers being advanced. Each of the guiding passages has an entrance portion that extends at an obtuse angle to and forms a bend with and associated one of the lanes, and each of the side walls which adjoins one of the bends on the outside thereof has an entrance portion which is constituted by a movable element having a guiding surface facing the interior of the associated guiding passage at the bend. That arrangement affords the advantage that that portion of the side wall which will be most strongly soiled by the wafers being advanced is formed by the guiding surface of the movable element so that the movable element can be continually adjusted to move successive portions of its guiding surface to a position for guiding and deflecting the wafers. That portion of the guiding surface of the movable element which is not contacted by the wafers at a given time can be cleaned by removal of residual filler composition in a cleaning device disposed outside the guiding passages.

In the device in accordance with the invention, the rows of wafers can be more strongly deflected in a lateral direction. Each guiding passage may consist of a plurality of straight identical guiding passage sections, which join each other at bends between consecutive passages. At each bend, the wafers will engage the guiding surface of the movable element which adjoins that bend on the outside and will slide along the guiding surface in the new direction.

The invention ensures that the guiding passages will be soiled only adjacent to the bends and soiling material which has been deposited will be removed by the adjustment of the movable element having the guiding surface.

In accordance with a further feature of the invention, the entrance portion of each side wall which adjoins a bend on the outside thereof is constituted by a rotatable disc, which is rotatable about an axis that is disposed under the supporting surface, and the disc has a side face which faces the interior of the guide passage and protrudes above the supporting surface and constitutes the guiding surface. With that design, the rotatable disc can be cleaned below the supporting surface and can be provided with oil, if desired, below the supporting surface.

In accordance with an alternative feature of the invention the entrance portion of each side wall which adjoins a bend on the outside thereof is constituted by a movable strip preferably by a revolvable endless belt, and the guiding surface is constituted by that surface of that strip which faces the interior of the passage.

DETAILED DESCRIPTION OF THE PREFERRED EMBODIMENTS

Illustrative embodiments of the invention will now be explained more in detail with reference to the drawings.

Figure 1:
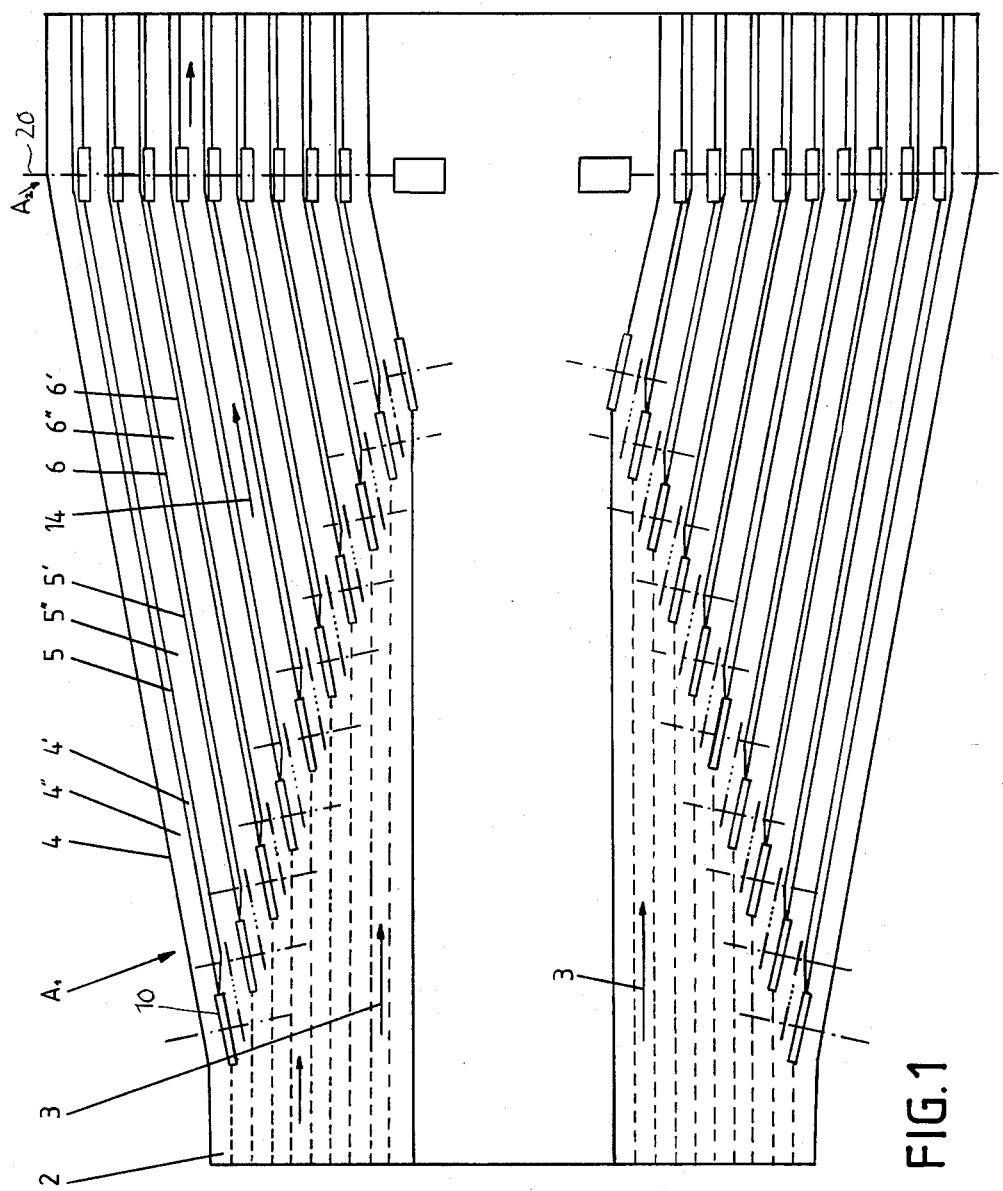
FIG. 1 is a top plan view showing apparatus for separating filled wafer slices, which apparatus is provided with a deflecting device in accordance with one embodiment of the invention.

FIG. 1 shows apparatus for separating filled wafers. As the filled wafers are pushed through a slicer and leave the same, they are arranged in longitudinal rows, which are closely spaced apart in a lateral direction. In that arrangement the rows of wafers are advanced on a plane supporting surface 2 in the direction indicated by the arrow 3 and are subsequently re-arranged by means of two deflecting devices $A_1$ and $A_2$ in accordance with the invention to form parallel longitudinal rows which have a larger lateral spacing.

Figure 2:
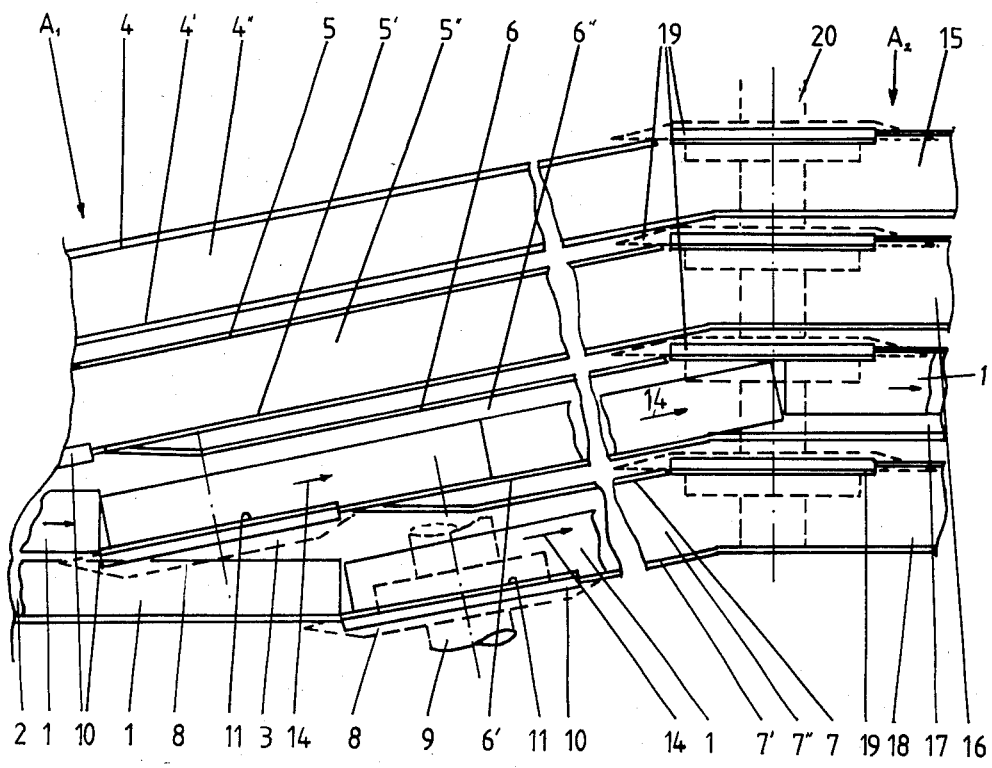
FIG. 2 is an enlarged view showing an embodiment which is similar to that of FIG. 1.
Figure 3:
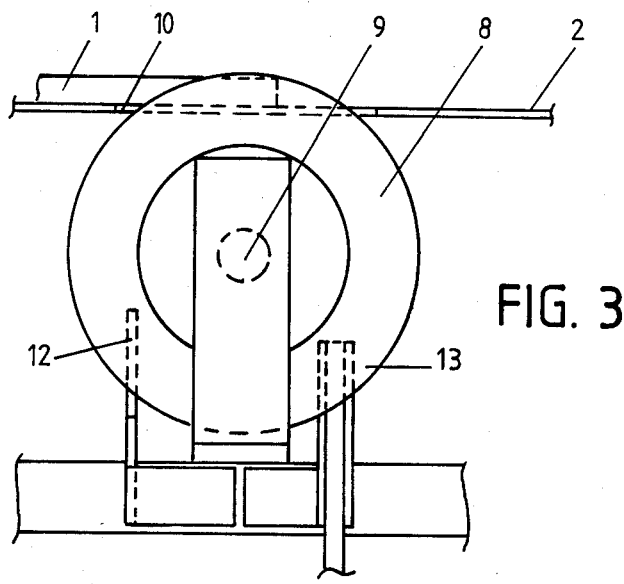
FIG. 3 is a side elevation coordinated with FIG. 2.

FIGS. 2 and 3 illustrate an embodiment of the deflecting device in accordance with the invention. Filled wafers 1 are advanced to the deflecting device in the direction of the arrow 3 on a plane supporting surface 2 having a plurality of juxtaposed lanes, on which the wafers are arranged in respective juxtaposed longitudinal rows. The wafers may come from a wafer block slicer, in which case the lateral distance between two rows of wafer slices is as large as the thickness of the cutting knives or cutting wires of the wafer block slicer. Pairs of parallel side walls 4, 4'; 5, 5'; 6, 6' and 7, 7' are provided on or over the supporting surface 2 and laterally define guiding passages 4", 5", 6", 7", respectively. At first deflecting device $A_1$, side walls 4 to 7' extend at an obtuse angle to the lanes on which the wafer slices are advanced in the direction of the arrow 3. The side walls 4 to 7' are offset from each other in the direction 3 so that each of the guiding passages 4" to 7" forms a bend with one of the lanes. Each of those side walls 5', 6' and 7' which adjoin the outside of the bend defined by the associated guiding passage 5", 6" or 7", repsectively, has an entrance portion which is constituted by a deflecting disc 8, which is rotatable about an axle or shaft 9 that is disposed under the supporting surface 2. Each deflecting disc extends through a longitudinal slot 10 in the supporting surface 2 and protrudes above the latter. Each deflecting disc 8 has a side face which protrudes above the supporting surface 2 and faces the interior of the associated guiding passage. That side face portion constitutes a movable guiding surface 11 for guiding the wafer slices 1. Each disc 8 has a double-beveled rim to facilitate the penetration of the deflecting discs 8 into the gaps between juxtaposed rows of wafer slices, which gaps have only a width that is equal to the thickness of a knife. Scraping knives 12 are disposed under the supporting surface 2 and associated with respective deflecting discs 8 and serve to remove particles of sticky filling material and the like which adhere to the guiding surface. An oiling device 13 for oiling the guiding surface is also associated with each deflecting disc 8 under the supporting surface.

In accordance with FIGS. 1 and 2, the deflecting devices are arranged in pairs, in which the deflecting devices staggered in the direction in which the wafer slices are advanced. The direction of advance from the second deflecting device $A_2$ is parallel to the direction of advance 3 to the first deflecting device $A_1$.

In the guiding passages 4", 5", 6" and 7" adjoining the first deflecting device $A_1$, the wafer slices 1 arranged in longitudinal rows are delivered in the direction of the arrows 14 to the succeeding deflecting device $A_2$, which has guiding passages 15, 16, 17 and 18 extending at acute angles to the guiding passages 4", 5" 6" and 7" and define respective bends with them. Each side wall adjoining the outside of a bend has an entrance portion which is constituted by a deflecting disc 19, and said deflecting discs 19 are mounted on a common axle or shaft 20. Those portions of the deflecting discs 19 which protrude above the supporting surface are offset from each other in the direction in which the wafers are carried off, i.e., in the direction of the arrow 14.

In the illustrative embodiment shown in FIG. 1, the wafers are pushed through two juxtaposed slicers and are deflected in two sets of juxtaposed rows. The rows of one set are deflected to the left and those of the other set to the right. Only the components of the deflecting devices of the left-hand set have been designated by reference numerals in FIG. 1.

If the wafers to be diverged come only from a single slicer, the wafers arranged in a single set of longitudinal rows will be deflected outwardly at the same time at both edges of the set.

We claim:

1. An apparatus for deflecting a plurality of laterally juxtaposed, substantially parallel, rectilinear rows of wafers filled with a sticky composition from a first direction to a second direction angularly diverging from the first direction, which comprises the combination of
    (a) a planar surface supporting the rows of wafers for advancement in said directions,
    (b) respective pairs of laterally spaced rectilinear side walls facing each other and defining substantially parallel guiding passages therebetween on the planar supporting surface for respective ones of the rows of wafers, the guiding passages extending in the second direction and the second direction angularly diverging from the first direction at a bend,
        (1) each guiding passage having an entrance portion at the bend defined between an outside side wall portion and an inside side wall portion, and
        (2) the entrance portions of the guide passages being staggered in the direction of advancement,
    (c) a respective rotary disc associated with the entrance portion of each one of the guiding passages, each rotary disc having
        (1) an upper portion protruding through a slot in the supporting surface and constituting a guiding face facing the guiding passage, the guiding face forming the outside side wall portion at the bend and deflecting successive ones of the wafers in each row at the entrance portion of each guiding passage from the first to the second direction as the rows of wafers are advanced in said directions,
    (d) a respective shaft arranged below the supporting surface and rotatably supporting each rotary disc, each shaft extending perpendicularly to the second direction, and
    (e) a cleaning device associated with each rotary disc and arranged below the supporting surface for removing any of the sticky composition adhering to the guiding face of the rotary disc.

2. The deflecting apparatus of claim 1, further comprising an oiling device associated with each rotary disc and arranged below the supporting surface for applying oil to the guiding face of the rotary disc.

3. An apparatus for deflecting a plurality of laterally juxtaposed, substantially parallel, rectilinear rows of wafers filled with a sticky composition from a first direction to a second direction angularly diverging from the first direction, which comprises the combination of
    (a) a planar surface supporting the rows of wafers for advancement in said directions,
    (b) respective pairs of laterally spaced rectilinear side walls facing each other and defining substantially parallel guiding passages therebetween on the planar supporting surface for respective ones of the rows of wafers, the guiding passages extending in the second direction and the second direction angularly diverging from the first direction at a bend,
        (1) each guiding passage having an entrance portion at the bend defined between an outside side wall portion and an inside side wall portion, and
        (2) the entrance portions of the guide passages being staggered in the direction of advancement,
    (c) a respective rotary disc associated with the entrance portion of each one of the guiding passages, each rotary disc having
        (1) an upper portion protruding through a slot in the supporting surface and constituting a guiding face facing the guiding passage, the guiding face forming the outside side wall portion at the bend and deflecting successive ones of the wafers in each row at the entrance portion of each guiding passage from the first to the second direction as the rows of wafers are advanced in said directions,
    (d) a respective shaft arranged below the supporting surface and rotatably supporting each rotary disc, each shaft extending perpendicularly to the second direction, and
    (e) an oiling device associated with each rotary disc and arranged below the supporting surface for applying oil to the guiding face of the rotary disc.

4. The deflecting apparatus of claim 3, further comprising a cleaning device associated with each rotary disc and arranged below the supporting surface for removing any of the sticky composition adhering to the guiding face of the rotary disc.

5. An apparatus for increasing the lateral spacing between a plurality of laterally juxtaposed, substantially parallel, rectilinear rows of wafers filled with a sticky composition, which comprises the combination of
   (a) a planar surface supporting the rows of wafers for advancement in successive first, second and third rectilinear directions, the first and third directions being substantially parallel to each other while the second direction angularly diverges from the first direction at a first bend and the third direction angularly diverges from the second direction at a second bend,
   (b) respective substantially parallel first guiding passages on the planar supporting surface for respective ones of the rows of wafers, the guiding passages extending from the first bend in the second direction,
      (1) each first guiding passage having an entrance portion at the first bend defined between an outside side wall portion and an inside side wall portion, and
      (2) the entrance portions of the first guide passages being staggered in the direction of advancement,
   (c) respective substantially parallel second guiding passages on the planar supporting surface for respective ones of the rows of wafers, the guiding passages extending from the second bend in the third direction,
      (1) each second guiding passage having an entrance portion at the second bend defined between an outside side wall portion and an inside side wall portion,
   (d) a respective rotary disc associated with the entrance portion of each one of the first and second guiding passages, each rotary disc having
      (1) an upper portion protruding through a slot in the supporting surface and constituting a guiding face facing the guiding passage, the guiding face forming the outside side wall portion at each bend and deflecting successive ones of the wafers in each row at the entrance portion of each guiding passage respectively from the first to the second direction and from the second to the third direction as the rows of wafers are advanced in said directions,
   (d) a respective shaft arranged below the supporting surface and rotatably supporting each rotary disc, each shaft supporting the rotary discs at the first bend extending along an axis perpendicularly to the second direction and each shaft supporting the rotary discs at the second bend extending along an axis perpendicularly to the third direction, and
   (e) a cleaning device associated with each rotary disc and arranged below the supporting surface for removing any of the sticky composition adhering to the guiding face of the rotary disc.

6. The apparatus of claim 5, further comprising an oiling device associated with each rotary disc and arranged below the supporting surface for applying oil to the guiding face of the rotary disc.

7. The apparatus of claim 5, wherein a common shaft rotatably supports the rotary discs at the second bend.

8. An apparatus for increasing the lateral spacing between a plurality of laterally juxtaposed, substantially parallel, rectilinear rows of wafers filled with a sticky composition, which comprises the combination of
   (a) a planar surface supporting the rows of wafers for advancement in successive first, second and third rectilinear directions, the first and third directions being substantially parallel to each other while the second direction angularly diverges from the first direction at a first bend and the third direction angularly diverges from the second direction at a second bend,
   (b) respective substantially parallel first guiding passages on the planar supporting surface for respective ones of the rows of wafers, the guiding passages extending from the first bend in the second direction,
      (1) each first guiding passage having an entrance portion at the first bend defined between an outside side wall portion and an inside side wall portion, and
      (2) the entrance portions of the first guide passages being staggered in the direction of advancement,
   (c) respective substantially parallel second guiding passages on the planar supporting surface for respective ones of the rows of wafers, the guiding passages extending from the second bend in the third direction,
      (1) each second guiding passage having an entrance portion at the second bend defined between an outside side wall portion and an inside side wall portion,
   (d) a respective rotary disc associated with the entrance portion of each one of the first and second guiding passages, each rotary disc having
      (1) an upper portion protruding through a slot in the supporting surface and constituting a guiding face facing the guiding passage, the guiding face forming the outside side wall portion at each bend and deflecting successive ones of the wafers in each row at the entrance portion of each guiding passage respectively from the first to the second direction and from the second to the third direction as the rows of wafers are advanced in said directions,
   (d) a respective shaft arranged below the supporting surface and rotatably supporting each rotary disc, each shaft supporting the rotary discs at the first bend extending along an axis perpendicularly to the second direction and each shaft supporting the rotary discs at the second bend extending along an axis perpendicularly to the third direction, and
   (e) an oiling device associated with each rotary disc and arranged below the supporting surface for applying oil to the guiding face of the rotary disc.

9. The apparatus of claim 8, further comprising a cleaning device associated with each rotary disc and arranged below the supporting surface for removing any of the sticky composition adhering to the guiding face of the rotary disc.

10. The apparatus of claim 8, wherein a common shaft rotatably supports the rotary discs at the second bend.

* * * * *